US010235097B2

(12) United States Patent
Singh et al.

(10) Patent No.: US 10,235,097 B2
(45) Date of Patent: Mar. 19, 2019

(54) AREA AND PERFORMANCE OPTIMIZED NAMESPACE SHARING METHOD IN VIRTUALIZED PCIE BASED SSD CONTROLLER

(71) Applicant: SAMSUNG ELECTRONICS CO., LTD., Suwon-si, Gyeonggi-Do (KR)

(72) Inventors: Vikram Singh, Bangalore (IN); Vamshi Krishna Komuravelli, Bangalore (IN); Manoj Thapliyal, Bangalore (IN); Chandrashekar Jagadish, Bangalore (IN)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 286 days.

(21) Appl. No.: 15/213,467

(22) Filed: Jul. 19, 2016

(65) Prior Publication Data

US 2017/0024166 A1  Jan. 26, 2017

(30) Foreign Application Priority Data

Jul. 21, 2015 (IN) .......................... 3752/CHE/2015
May 20, 2016 (IN) .......................... 3752/CHE/2015

(51) Int. Cl.
*G06F 12/00* (2006.01)
*G06F 3/06* (2006.01)
*G06F 12/02* (2006.01)

(52) U.S. Cl.
CPC .......... *G06F 3/0659* (2013.01); *G06F 3/0622* (2013.01); *G06F 3/0679* (2013.01); *G06F 12/0246* (2013.01); *G06F 2212/7206* (2013.01); *G06F 2212/7207* (2013.01); *G06F 2212/7209* (2013.01)

(58) Field of Classification Search
CPC .... G06F 3/0659; G06F 3/0622; G06F 3/0679; G06F 12/0246; G06F 2212/7206; G06F 2212/7207; G06F 2212/7209
See application file for complete search history.

(56) References Cited

U.S. PATENT DOCUMENTS 9,003,071 B2  4/2015  Liu

*Primary Examiner* — Matthew Bradley
(74) *Attorney, Agent, or Firm* — Volentine, Whitt & Francos, PLLC

(57) ABSTRACT

A method for handling namespace reservations in a Non Volatile Memory express (NVMe) controller includes a NVMe hardware module collecting a data access request from a host device, the NVMe hardware module determining a validity of the collected data access request, wherein the validity of the data access request is determined based a reservation specific to the host and data indicated in the data access request, and the NVMe hardware module notifying the NVMe firmware module of the determined validity of the collected data access request. The method further includes a NVMe firmware module accepting the data access request when the data request is notified by the NVMe hardware module as being valid, and the NVMe firmware module rejecting the data access request when the data request is notified by the NVMe hardware module as being invalid.

20 Claims, 4 Drawing Sheets

Fig. 4

| NSID | Host_1 | | | | Host_2 | | | | ... | Host_M | | | |
|---|---|---|---|---|---|---|---|---|---|---|---|---|---|
| | Active | Shared | Read Conflict | Write Conflict | Active | Shared | Read Conflict | Write Conflict | | Active | Shared | Read Conflict | Write Conflict |
| 1 | Yes | Yes | C | C | Yes | No | C | C | | Yes | Yes | C | C |
| 2 | Yes | Yes | A | A | Yes | Yes | A | C | | Yes | Yes | A | A |
| ... | | | | | | | | | | | | | |
| NN-1 | Yes | Yes | A | A | Yes | Yes | A | C | | Yes | Yes | A | A |

Lookup table

AREA AND PERFORMANCE OPTIMIZED NAMESPACE SHARING METHOD IN VIRTUALIZED PCIE BASED SSD CONTROLLER

CROSS-REFERENCE TO RELATED APPLICATION

A claim of priority under 35 U.S.C. § 119 is made to Indian Patent Application No. 3752/CHE/2015 filed Jul. 21, 2015, and to Indian Patent Application No. 3752/CHE/2015 filed May 20, 2016, the disclosures of which are incorporated herein by reference in their entireties.

BACKGROUND

The inventive concepts related to data storage systems and, more particularly, to the handling of Non-Volatile Memory express (NVMe) reservations in data storage systems.

Capacity, performance and power requirements associated with digital data storage devices continue to challenge computing systems such as data processing systems and communications systems. A solid state drive (SSD) is a high performance storage device that is used for data storage purposes. SSDs are much faster, and typically include a controller to manage the data storage. The controller manages operations of the SSD, including data storage and access as well as communication between the SSD and a host device.

Non-Volatile Memory Host Controller Interface Specification (NVMHCI) or Non-Volatile Memory Express (NVMe) is an interface standard that deals with local non-volatile memory access. NVMe is a register level interface that allows host software to communicate with a nonvolatile memory subsystem. This interface is optimized for enterprise and client SSDs. NVMe provides a direct Input/Output (I/O) access to the local non-volatile memory. NVMe helps to reduce latency of read and write operations.

In an enterprise storage market, multi-path and virtualization are two vital features in storage devices to share data among multiple host entities. While the data sharing feature allows multiple hosts to access the data as and when required, the same rises data security concerns as well. In the shared usage scenarios, an adequate mechanism(s) needs to be provided to protect the shared data, without affecting normal operations of the system. NVMe specification provides a mechanism known as "Reservations", to protect the shared resources. Reservations provide capabilities that may be utilized by two or more hosts to have coordinated access to a shared namespace. A reservation on a namespace for a host restricts the host's access to that namespace. If a host submits a command to access a particular namespace, in the presence of a reservation, the command is verified in the light of defined permissions, and accordingly, access to the requested shared namespace is provided or denied. Lack of access to a shared namespace is treated as a 'Reservation Conflict'. Capabilities are provided to allow recovery from a reservation held by a failing or uncooperative host.

SUMMARY

According to an aspect of the inventive concepts, a method for handling namespace reservations in a Non Volatile Memory express (NVMe) controller, the NVMe controller including an NVMe hardware module and a NVMe firmware module. The method includes the NVMe hardware module collecting a data access request from a host device, the NVMe hardware module determining a validity of the collected data access request, wherein the validity of the data access request is determined based a reservation specific to the host and data indicated in the data access request, and the NVMe hardware module notifying the NVMe firmware module of the determined validity of the collected data access request. The method further includes the NVMe firmware module accepting the data access request when the data request is notified by the NVMe hardware module as being valid, and the NVMe firmware module rejecting the data access request when the data request is notified by the NVMe hardware module as being invalid.

According to another aspect of the inventive concepts, a data management system is provided which includes a Non Volatile Memory express (NVMe) hardware module, a NVMe firmware module, and a hardware processor and memory configured to control the NVMe hardware module to collect a data access request from a host device, to determine a validity of the collected data access request, wherein the validity of the data access request is determined in terms of a reservation specific to the host and data indicated in the data access request, and to notify the NVMe firmware module of the determined validity of the collected data access request. The hardware processor and memory are further configured to control the NVMe firmware module to accept the data access request when the data request notified as being valid by the NVMe hardware module, and to reject the data access request when the data request notified as being invalid by the NVMe hardware module.

According to yet another aspect of the inventive concepts, a Non Volatile Memory express (NVMe) controller is provided which includes a NVMe hardware module and a NVMe firmware module. The NVMe hardware module is configured to collect a data access request from a host device, to determine a validity of the collected data access request, wherein the validity of the data access request is determined in terms of a reservation specific to the host and data indicated in the data access request, and to notify the NVMe firmware module of the determined validity of the collected data access request. The NVMe firmware module is configured to accept the data access request when the data request notified as being valid by the NVMe hardware module, and to reject the data access request when the data request notified as being invalid by the NVMe hardware module.

BRIEF DESCRIPTION OF THE DRAWINGS

The above and other aspects of the inventive concepts will become readily apparent from the detailed description that follows, with reference to the accompanying drawings, in which:

FIG. 4 depicts an example of the structure of a Lookup Table maintained by an NVMe controller of the data management system of FIG. 1, according to one or more embodiments of the inventive concepts.

DETAILED DESCRIPTION

Figure 1:
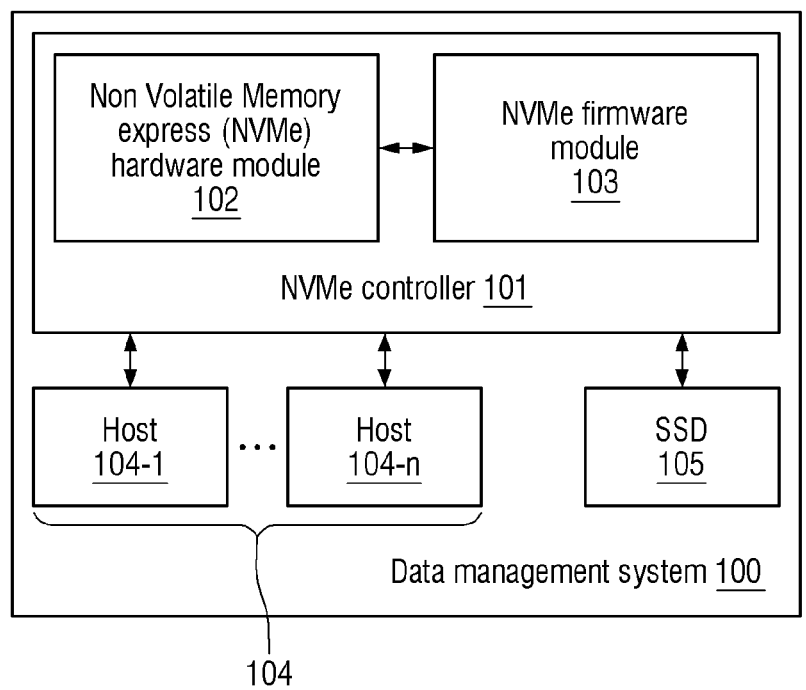
FIG. 1 is a block diagram of data management system according to one or more embodiments of the inventive concepts.

The inventive concepts will now be explained more fully with reference to the non-limiting embodiments that are illustrated in the accompanying drawings and detailed in the following description.

Descriptions of well-known components and processing techniques are omitted so as to not unnecessarily obscure the description herein. The examples used herein are intended to facilitate an understanding of ways in which the inventive concepts may be practiced and to further enable those skilled in the art to make and use embodiments of the inventive concepts. However, the examples presented should not be construed as limiting the scope of the inventive concepts.

As is traditional in the field of the inventive concepts, embodiments are described, and illustrated in the drawings, in terms of functional modules. Those skilled in the art will appreciate that these modules are physically implemented by electronic (or optical) circuits such as logic circuits, discrete components, microprocessors, hard-wired circuits, memory elements, wiring connections, and the like, which may be formed using semiconductor-based fabrication techniques or other manufacturing technologies. In the case of the modules being implemented with microprocessors or similar, they may be programmed using software (e.g., microcode) to perform various functions discussed herein and may optionally be driven by firmware and/or software. Alternatively, unless otherwise stated, each module may be implemented by dedicated hardware, or as a combination of dedicated hardware to perform some functions and a processor (e.g., one or more programmed microprocessors and associated circuitry) to perform other functions. Also, unless otherwise stated, each module of the embodiments may be physically separated into two or more interacting and discrete modules without departing from the scope of the inventive concepts. Conversely, unless otherwise stated, each module of the embodiments may be physically combined into more complex modules without departing from the scope of the inventive concepts.

Further, the terms hardware, software and firmware are used herein in a manner consistent with understood definitions of those skilled in the art. That is, hardware denotes physical components of a system, while software denotes an arrangement of digital instructions (or code) that guide the operation of hardware. Generally, software is loaded from storage (flash, disk, network, etc) into a system's operating memory (e.g., RAM) on demand. Firmware denotes a special class of software that generally is not intended to change once shipped, and for this reason it is usually embedded in read only memory (ROM) of a system. An update typically requires either a swap of chips or a special process to reload the memory containing the software.

In the existing SSD NVMe systems, generally the reservation handling is performed by firmware of the NVMe system. The firmware is responsible for maintaining the reservation table (the table in which access permissions are specified), identifying whether or not to allow a request, and then allowing or denying a data request. However, the number of hosts among which the data is shared can vary according to different implementation scenarios. In certain cases in which the number of hosts requesting data is high, the firmware becomes overloaded, which in turn adversely affects performance of the system as well as negatively impacting the Quality of Service (QoS). As will be explained below, embodiments of the inventive concepts mitigate this drawback by at least in part segregating functionality between a hardware module and a firmware module of the NVMe system. That is, some front end reservation handling functionality is off-loaded to "a hardware module"that is separate from the firmware module of an NVMe controller, to thereby reduce overloading of the firmware of the NVMe controller. The embodiments may also be effective to reduce storage space requirements for NVMe reservation in the NVMe Controller, and to enable namespace sharing by multiple hosts.

FIG. 1 is a block diagram of data management system according to one or more embodiments of the inventive concepts. As shown, the data management system 100 of this example includes a Non Volatile Memory express (NVMe) controller 101, one or more Hosts 104-1 through 104-n (n is a positive integer), and at least one Solid State Drive (SSD) 105. The NVMe controller 101 of this example includes an NVMe hardware module 102, and an NVMe firmware module 103. In addition, although not shown, the NVMe controller 101 may include additional components such as I/O interfaces, one or more data busses, one or more central processing units (CPUs), error correction code (ECC) circuitry, random access memory (RAM), and the like.

The NVMe hardware module 102 is implemented of hardware only, or a combination of hardware and software. The NVMe hardware module 102 is configured to receive at least one data access request from a host among the hosts 104-1 through 104-n. In an embodiment, the NVMe hardware module 102 can receive data access request from more than one host 104, at once. The NVMe hardware module 102 can be further configured to verify whether the collected data access command is valid or not, in terms of pre-defined reservation for the host 104. The NVMe hardware module 102 can be further configured to notify the NVMe firmware module 103, whether the collected data access request is valid or not. In an embodiment, the NVMe hardware module 102 notifies validity of the data access request, by setting value of a specific field (assume that the field is termed as reservation Conflict 'RC') in the data access request to a particular value that represents the determined validity of the data access request, wherein the mentioned field in the data access request, and values of the field to represent validity of the data request are pre-determined, and can be changed as and when required. For example, value of RC equal to '1' indicates a reservation conflict which means that the data access request is invalid. Similarly, value of RC equal to '0' indicates 'reservation allowed' which means that the data access request is valid. In an embodiment, the NVMe hardware module 102 stores a lookup table (as in FIG. 4, described later) which specifies reservations for each host 104 connected to the NVMe controller 101. In another embodiment, the NVMe hardware module 102 can be configured to receive a data update request from the host 104 and check validity of the data update request. The NVMe hardware module 102 can be further configured to receive and process a namespace access request from a host 104, and check validity of the namespace access request based on data in the lookup table. If the status of the host that sent the namespace access request is at least one of "active" or "valid", then the access request is considered as valid. If the status of the host that sent the namespace access request is at least one of "inactive" or "invalid", then the access request is considered as invalid. Similarly, if the status of the host that sent the namespace access request is not available and is marked as "Not shared", then the access request is considered as invalid. The NVMe hardware module 102 can be further configured to convey information pertaining to validity of the namespace access request to the NVMe firmware module 103.

In an embodiment, for any host, the permission for data and/or namespace access can be dynamically updated by changing values in the lookup table. In the update process, the NVMe firmware module 103 receives an update request from a host 104, and accordingly updates the lookup table to reflect new reservation status of the host.

The NVMe firmware module 103 is configured to collect information pertaining to validity of a data access request, from the NVMe hardware module 102, as input. The NVMe firmware module 103 can be further configured to allow or deny access to data, for the host 104 that sent the data access request, based on the value of RC. The NVMe firmware module 103 can be further configured to allow/deny permission for the host to update the lookup table, if the request received is an update request, based on the validity of the request as indicated by the NVMe controller 102. The NVMe firmware module 103 can be configured to collect validity information pertaining to a namespace access request received from a host 104, from the NVMe hardware module 102. The NVMe firmware module 103 can be further configured to further process or deny the namespace access request, based on the validity of the namespace access request.

Figure 2:
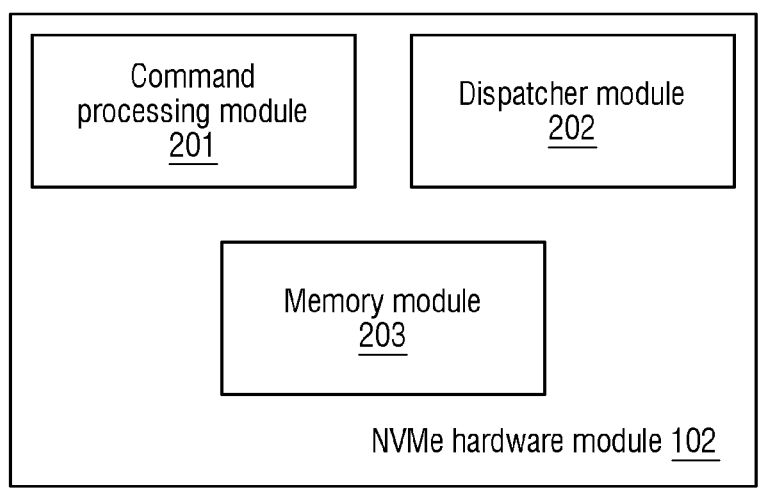
FIG. 2 is a block diagram depicting components of an NVMe hardware module of the data management system of FIG. 1, according to one or more embodiments of the inventive concepts.

FIG. 2 is a block diagram that depicts components of NVMe hardware module, according to an embodiment of the inventive concepts. The NVMe hardware module of this example includes a command processing module 201, a dispatcher module 202, and a memory module 203.

The command processing module 201 is configured to receive, using at least one suitable interface, a data access/update request from at least one host 104. The command processing module 201 can be configured to process the received request using any suitable request processing technique, and then identify the request as at least one of the data access/update requests. The command processing module 201 can be further configured to determine validity of the received request/command, based on reservation details in the lookup table maintained in the memory module 203. The command processing module 201 can be further configured to convey details of the received request to the dispatcher module 202, through a suitable channel.

The dispatcher module 202 can be configured to perform at least one action that matches the validity of the request. In an embodiment, if the received request is invalid, the dispatcher module 202 updates value of 'RC field' in the request to indicate that there is a 'Reservation conflict'. If the received request is valid, the dispatcher module 202 updates value of 'RC field' in the request to indicate that there is no 'Reservation conflict' and that the request can be accepted. If the request is identified as 'valid', the dispatcher module 202 identifies, based on the type of request, at least one processor in the NVMe firmware module 103 that is configured to handle that particular type of request. For example, a type 1 processor in the NVMe firmware module 103 can be configured to handle data update request, and one or more type 2 processor(s) can be configured to handle a data access request. The data access request further includes reservation acquire/register/release/unregister command. In another embodiment, the data access request is a namespace access request from a host 104. The memory module 203 can be configured to store any data that is required for executing the 'reservation handling' process. In an embodiment, the memory module 203 stores the lookup table which possesses the reservation details corresponding to one or more hosts 104. In another embodiment, the memory module 203 stores namespace access permission for at least one host 104, pertaining to at least one namespace.

Figure 3:
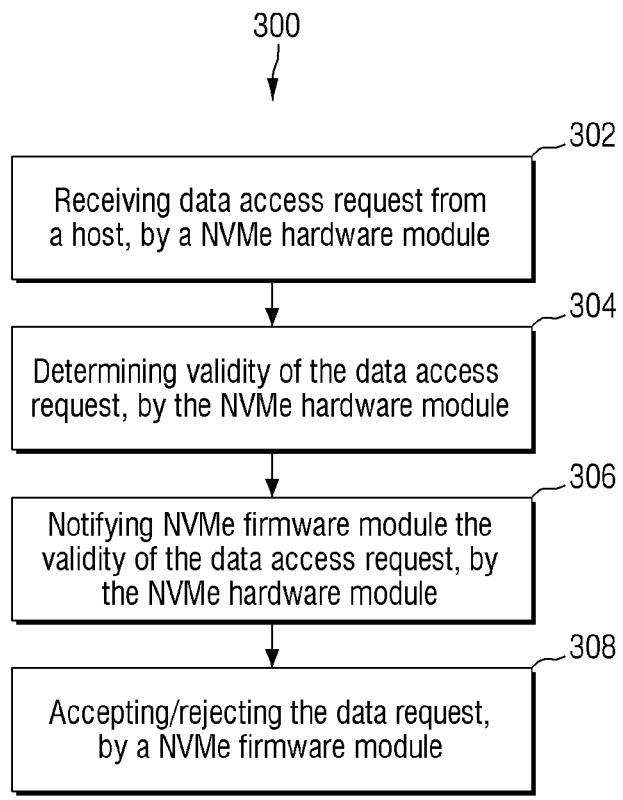
FIG. 3 is a flow diagram for reference in describing a process of providing data access in the data management system of FIG. 1, according to one or more embodiments of the inventive concepts.

FIG. 3 is a flow diagram that depicts steps involved in the process of providing data access in the data management system, according to an embodiment of the inventive concepts. The NVMe hardware module 102 receives (302) a data/namespace access request from at least one host 104. The NVMe hardware module 102 determines (304) validity of the received data/namespace access request, based on reservation permissions defined and stored in the memory module 203. In this process, upon receiving the data/namespace access request from a particular host 104, the NVMe hardware refers to the lookup table and checks whether that particular host has permission to access the requested data and/or namespace. In an embodiment, the information pertaining to namespace access permission for at least one host 104 is stored in the lookup table. In an embodiment, in the lookup table, information specific to each host is associated with NSID (which is unique across NVM Subsystem) to differentiate between data specific to each host.

The NVMe hardware module 102 further notifies (306) the NVMe firmware module 103 of the validity of the access request. In an embodiment, the NVMe hardware module 102 sets a value of a particular field in the data access request to a specific value that indicates validity of the request. The NVMe firmware module 103, based on the determined validity, accepts or rejects (306) the request. The various actions in method 300 may be performed in the order presented, in a different order or simultaneously. Further, in some embodiments, some actions listed in FIG. 3 may be omitted.

The embodiments disclosed herein can be implemented through at least one software program running on at least one hardware device and performing network management functions to control the network elements. The network elements shown in FIG. 2 include blocks which can be at least one of a hardware device, or a combination of hardware device and software module.

FIG. 4. depicts an example of a lookup table discussed previously, which may be stored in software form in the memory module 203 of the NVMe hardware module 102. In the example of FIG. 4, the lookup table includes rows 1 through NN-1 (where NN-1 denoted a positive integer) for the respective namespace IDs (NSID). In addition, the lookup table of this example includes multiple rows for each of plural host devices Host_1 through Host_M (where M is a positive integer). Each host device occupies four (4) columns of the lookup table Active, Shared, Read Conflict and Write Conflict. In the figure, "C" denotes a conflict status, and "A" denotes a no-conflict states.

Figure 5:
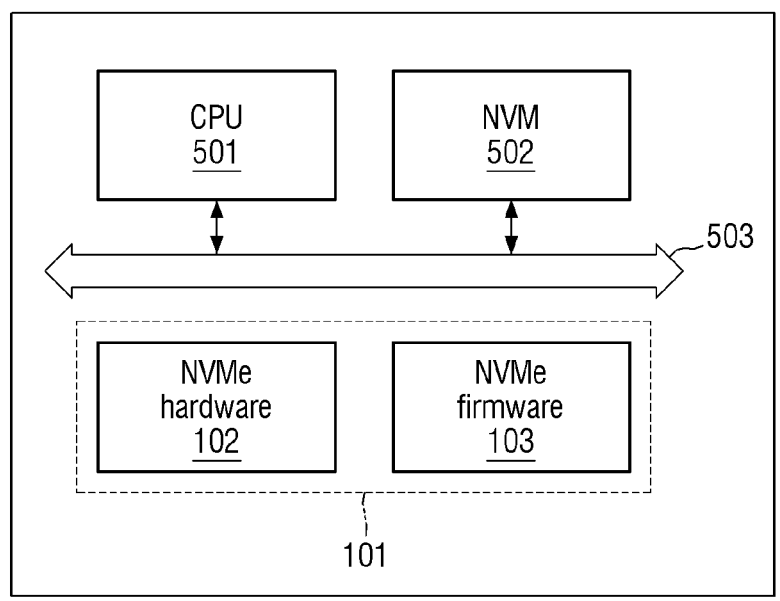
FIG. 5 is a block diagram of data management system according to one or more embodiments of the inventive concepts.

According to some embodiments of the inventive concepts, the data management system includes a hardware processor and a memory which control the NVMe controller to function as described previous herein. An example of this is depicted in FIG. 5 which illustrates data management system 100*a* which includes a hardware processor (CPU) 501, a nonvolatile memory (NVM) 502, an NVMe controller 101, and a data bus system 503 for providing communication between the CPU 501, NVM 502 and NVMe controller 101. The NVM 502 is configured to store instructions executed by the CPU 501. In this manner, the CPU 501 directs the NVMe hardware module 102 and the NVMe firmware module 103 of the NVMe controller 101 to operate as described in accordance with previous embodiments herein.

The embodiments disclosed herein specify a mechanism for reservation handling in NVMe system. The mechanism allows splitting reservation handling between hardware and firmware of the NVMe system, providing a system thereof. The term 'reservation handling' can refer to namespace reservation handling, and the terms 'reservation handling' and 'namespace reservation handling' are used interchangeably throughout the specification.

It is understood that the scope of protection is extended to such a system and by extension, to a computer readable means having a message therein, said computer readable means containing a program code for implementation of one or more steps of the method, when the program runs on a server or mobile device or any suitable programmable device. The method is implemented in a preferred embodiment using the system together with a software program written in, for example Very high speed integrated circuit Hardware Description Language (VHDL), another programming language, or implemented by one or more VHDL or several software modules being executed on at least one hardware device. The hardware device can be any kind of device which can be programmed including, for example any kind of a computer like a server or a personal computer, or the like, or any combination thereof, for example one processor and two FPGAs. The device may also include means which could be for example hardware means like an ASIC or a combination of hardware and software means, an ASIC and an FPGA, or at least one microprocessor and at least one memory with software modules located therein. Thus, the means are at least one hardware means or at least one hardware-plus-software means.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the claims as described herein.

What is claimed is:

1. A method for handling namespace reservations in a Non Volatile Memory express (NVMe) controller, the NVMe controller including an NVMe hardware module and a NVMe firmware module, the method comprising:
    the NVMe hardware module collecting a data access request from a host device;
    the NVMe hardware module determining a validity of the collected data access request, wherein the validity of the collected data access request is determined based on a reservation status of the host device and data indicated in the collected data access request;
    the NVMe hardware module notifying the NVMe firmware module of the determined validity of the collected data access request;
    the NVMe firmware module accepting the collected data access request when the collected data access request is notified by the NVMe hardware module as being valid; and
    the NVMe firmware module rejecting the collected data access request when the collected data access request is notified by the NVMe hardware module as being invalid.

2. The method as claimed in claim 1, wherein the NVMe controller is configured to collect data access requests from a plurality of host devices, and the data access request is a namespace access request, said method comprising:
    the NVMe hardware module collecting the namespace access request from the host device among the plurality of host devices;
    the NVMe hardware module determining whether the host device has permission to access a namespace to which access is requested, wherein access permission is checked based on data in a lookup table;
    the NVMe hardware module notifying the NVMe firmware module of the access permission of the collected namespace access request;
    the NVMe firmware module allowing the host device access to the requested namespace when notified by the NVMe hardware module that the host device has access permission; and
    the NVMe firmware module denying the host device access to the requested namespace when notified by the NVMe hardware module that the host device does not have access permission.

3. The method as claimed in claim 2, wherein said determining, by the NVMe hardware module, whether the host device has permission to access the namespace comprises:
    determining the collected namespace access request as valid when the data in the lookup table indicates a status of the host device relative to the namespace is at least one of "active" and "Valid"; and
    determining the collected namespace access request as invalid when the data in the lookup table indicates that the status of the host device relative to the namespace is at least one of "Inactive","Invalid" and "Not Shared".

4. The method as claimed in claim 2, further comprising updating the data in the lookup table in response to an update command received from the host device.

5. The method as claimed in claim 1, wherein data access is to a solid state drive (SSD).

6. A data management system, comprising:
    a Non Volatile Memory express (NVMe) hardware module;
    a NVMe firmware module; and
    a hardware processor and a memory configured to control the NVMe hardware module to collect a data access request from a host device, to determine a validity of the collected data access request, wherein the validity of the collected data access request is determined based on a reservation status of the host device and data in the collected data access request, and to notify the NVMe firmware module of the determined validity of the collected data access request,
    wherein the hardware processor and the memory are further configured to control the NVMe firmware module to accept the collected data access request when the collected data access request is notified as being valid by the NVMe hardware module, and to reject the collected data access request when the collected data access request is notified as being invalid by the NVMe hardware module.

7. The data management system as claimed in claim 6, wherein the memory is a nonvolatile memory.

8. The data management system as claimed in claim 6, further comprising at least one solid state drive (SSD) to which data access is requested.

9. The data management system as claimed in claim 8, wherein the host device is one of a plurality of host devices requesting data access to the at least one SSD.

10. The data management system as claimed in claim 9, wherein the hardware processor and the memory are configured to execute a reservation handling for namespace sharing of the at least one SSD.

11. The data management system as claimed in claim 10, wherein the reservation handling for namespace sharing includes:
   the NVMe hardware module collecting a namespace access request from the host device among the plurality of host devices;
   the NVMe hardware module determining whether the host device has permission to access a namespace to which access is requested, wherein the access permission is checked based on data in a lookup table;
   the NVMe hardware module notifying the NVMe firmware module of the access permission of the collected namespace access request;
   the NVMe firmware module allowing the host device access to the requested namespace when notified by the NVMe hardware module that the host device has access permission; and
   the NVMe firmware module denying the host device access to the requested namespace when notified by the NVMe hardware module that the host device does not have access permission.

12. The data management system as claimed in claim 11, wherein said determining, by the NVMe hardware module of whether the host device has permission to access the namespace comprises:
   determining the collected namespace access request as valid when the data in the lookup table indicates a status of the host device relative to the namespace is at least one of "active" and "Valid"; and
   determining the collected namespace access request as invalid when the data in the lookup table indicates that the status of the host device relative to the namespace is at least one of "Inactive","Invalid" and "Not Shared".

13. A Non Volatile Memory express (NVMe) controller, comprising:
   a NVMe hardware module configured to collect a data access request from a host device, to determine a validity of the collected data access request, wherein the validity of the collected data access request is determined based on a reservation status of the host device and data indicated in the collected data access request, and to provide notification of the determined validity of the collected data access request; and
   a NVMe firmware module configured to accept the collected data access request when the notification provided by the NVMe hardware module indicates the collected data access request as being valid, and to reject the collected data access request when the notification provided by the NVMe hardware module indicates the collected data access request as being invalid.

14. The NVMe controller of claim 13, wherein the NVMe hardware module comprises:
   a memory module configured to store a lookup table; and
   a command processing module configured to receive the data access request from the host device as the collected data access request and to determine the validity of the collected data access request based on reservation details stored in the lookup table.

15. The NVMe controller of claim 14, wherein the command processing module is further configured to receive an update command from the host device.

16. The NVMe controller of claim 15, wherein the NVMe hardware module further comprises a dispatcher module configured to provide the notification to the NVMe firmware module of the determined validity of the collected data access requested.

17. The NVMe controller as claimed in claim 16, wherein the dispatcher module is further configured to notify the NVMe firmware module of the update command.

18. The NVMe controller as claimed in claim 13, wherein the host device is one of a plurality of host devices requesting data access to at least one solid state drive (SSD).

19. The NVMe controller as claimed in claim 18, wherein the NVMe hardware module and the NVMe firmware module are configured to execute a reservation handling for namespace sharing of the at least one SSD.

20. The NVMe controller as claimed in claim 19, wherein the reservation handling for namespace sharing includes:
   the NVMe hardware module collecting a namespace access request from the host device among the plurality of host devices;
   the NVMe hardware module determining whether the host device has permission to access a namespace to which access is requested, wherein the access permission is checked based on data in a lookup table;
   the NVMe hardware module notifying the NVMe firmware module of the access permission of the collected namespace access request;
   the NVMe firmware module allowing the host device access to the requested namespace when notified by the NVMe hardware module that the host device has access permission; and
   the NVMe firmware module denying the host device access to the requested namespace when notified by the NVMe hardware module that the host device does not have access permission.

* * * * *